(12) United States Patent
Sato et al.

(10) Patent No.: US 6,592,481 B2
(45) Date of Patent: Jul. 15, 2003

(54) SYNCHRONOUS DRIVE ARRANGEMENT FOR A PRINTER

(75) Inventors: Hisashi Sato, Miyagi (JP); Keiichi Chiba, Miyagi (JP)

(73) Assignee: Tohoku Ricoh Co., Ltd., Shibata-gun (JP)

( * ) Notice: Subject to any disclaimer, the term of this patent is extended or adjusted under 35 U.S.C. 154(b) by 0 days.

(21) Appl. No.: 09/800,506

(22) Filed: Mar. 8, 2001

(65) Prior Publication Data

US 2001/0024986 A1 Sep. 27, 2001

(30) Foreign Application Priority Data

Mar. 9, 2000 (JP) ......................................... 2000-064950

(51) Int. Cl.[7] ................................................. F16H 7/12
(52) U.S. Cl. ........................ 474/134; 474/118; 101/116
(58) Field of Search ........................... 474/101; 101/248, 101/116; 156/303.1, 304.6

(56) References Cited

U.S. PATENT DOCUMENTS

| 2,954,726 A | * | 10/1960 | Kerridge | 404/114 |
|---|---|---|---|---|
| 3,575,058 A | * | 4/1971 | Kraus | 474/109 |
| 4,191,062 A | * | 3/1980 | Gardner | 474/132 |
| 4,541,823 A | * | 9/1985 | Marsh et al. | 156/138 |
| 4,689,038 A | * | 8/1987 | Henderson | 474/201 |
| 6,117,034 A | * | 9/2000 | Vine | 474/134 |
| 6,205,918 B1 | * | 3/2001 | Takahashi et al. | 101/115 |
| 6,314,877 B1 | * | 11/2001 | Takasawa | 101/115 |
| 6,382,094 B1 | * | 5/2002 | Chiba et al. | 101/115 |

FOREIGN PATENT DOCUMENTS

| JP | 4-329175 | 11/1992 | |
| JP | 7-17121 | 1/1995 | |
| JP | 07017121 | * 1/1995 | 101/116 |
| JP | 8-62737 | 3/1996 | |

* cited by examiner

*Primary Examiner*—Christopher P. Schwartz
*Assistant Examiner*—Devon Kramer
(74) *Attorney, Agent, or Firm*—Oblon, Spivak, McClelland, Maier & Neustadt, P.C.

(57) ABSTRACT

A synchronous drive arrangement for a printer of the present invention includes a timing belt passed over drive pulleys each being mounted on a particular print drum. The timing belt is made up of two narrow belt parts produced by dividing a single belt. Assuming that the belt parts have n teeth each, one of the belt parts is shifted from the other belt part by one-half of the number of teeth n. The belt parts are so positioned as to cancel each other's eccentricity component during rotation. The arrangement reduces synchronization errors ascribable to the eccentricity of the timing belt while preserving the low-cost configuration of timing belt connection.

13 Claims, 13 Drawing Sheets

(ORIGINAL BELT)

(ENTIRE TIMING BELT)

SYNCHRONOUS DRIVE ARRANGEMENT FOR A PRINTER

BACKGROUND OF THE INVENTION

The present invention relates to a single-pass type color printer and more particularly to a synchronous drive arrangement for synchronously driving rotary members included in the printer.

Today, a stencil printer capable of producing a great number of prints at low cost is extensively used. The stencil printer includes a plurality of print drums arranged side by side in a direction in which a paper sheet or similar recording medium is conveyed. The print drums each are assigned to a particular color. While a paper sheet is passed only once, an image of the first color to an image of the last color are sequentially transferred from the print drums to the paper sheet one above the other, completing a color image. While such a single pass system is more efficient than a system of the type replacing a print drum color by color, it has problems ascribable to a short distance between the print drums.

Specifically, an ink image transferred from an upstream print drum or drive member assigned to, e.g., a first color reaches the nip of a downstream print drum or driven member assigned to, e.g., a second color in a wet state. As a result, the ink image is transferred to a master or perforated stencil wrapped around the downstream print drum and then to the next paper sheet.

More specifically, the transfer of the wet ink of the first color to the master wrapped around the downstream print drum does not matter for the first paper sheet. As for the second paper sheet, however, the ink of the first color is transferred from the above master to an image of the first color transferred from the upstream print drum to the paper sheet (so-called retransfer). Retransfer, i.e., the overlap of ink of the same color is not critical in the aspect of image quality if free from positional deviation. However, if the retransferred image is deviated from the original image, an offset ghost appears on the paper sheet. For a given amount of deviation, an offset ghost causes a thick line to appear blurred and causes a thin line to appear doubled, lowering image quality to a critical degree.

Retransfer stated above is not avoidable with a single pass type of color printer. An offset ghost is, however, ascribable to the positional deviation of transfer and can therefore be accurately reduced if the upstream and downstream print drums accurately rotate in synchronism with each other for thereby conveying a paper sheet with accuracy.

To reduce an offset ghost, it has been customary to connect the upstream and downstream print drums as to drive. Japanese Patent Laid-Open Publication No. 4-329175, for example, teaches a system that connects the shafts of the print drums by using a plurality of gears. Japanese Patent Laid-Open Publication No. 7-17121, for example, proposes a system that connects the print drums by using timing pulleys and a timing belt.

The gear scheme is capable of reducing the deviation of an offset ghost. This scheme, however, uses a plurality of precision gears and therefore increases the production cost. The timing belt scheme produces an offset ghost and, moreover, aggravates deviation thereof, as will be described specifically later with reference to the accompanying drawings.

Technologies relating to the present invention are also disclosed in, e.g., Japanese Patent Laid-Open Publication No. 8-62737.

SUMMARY OF THE INVENTION

It is therefore an object of the present invention to provide a synchronous drive arrangement for timing belt connection capable of reducing the deviation of synchronous rotation between rotary members, and a synchronous driving method therefor.

It is another object of the present invention to provide a synchronous drive arrangement for timing belt connection, which is included in a printer, capable of reducing the deviation of synchronous rotation between print drums, and a synchronous driving method therefor.

It is a further object of the present invention to implement the above synchronous drive arrangement and synchronous driving method at low cost. In accordance with the present invention, a synchronous drive arrangement includes a drive member and a driven member each including a respective toothed pulley, and a timing belt passed over the toothed pulleys for causing the drive member and driven member to rotate in synchronism with each other. The timing belt is made up of a plurality of narrow belt parts arranged side by side in the axial direction of the pulleys and so positioned as to cancel each other's eccentricity component.

Also, in accordance with the present invention, in a method of causing a drive member and a driven member spaced from each other to rotate in synchronism with each other via a timing belt passed over the drive member and driven member, the timing belt is made up of a plurality of narrow belt parts arranged side by side in the axial direction of the drive member or the driven member and so positioned as to cancel each other's eccentricity component during rotation.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
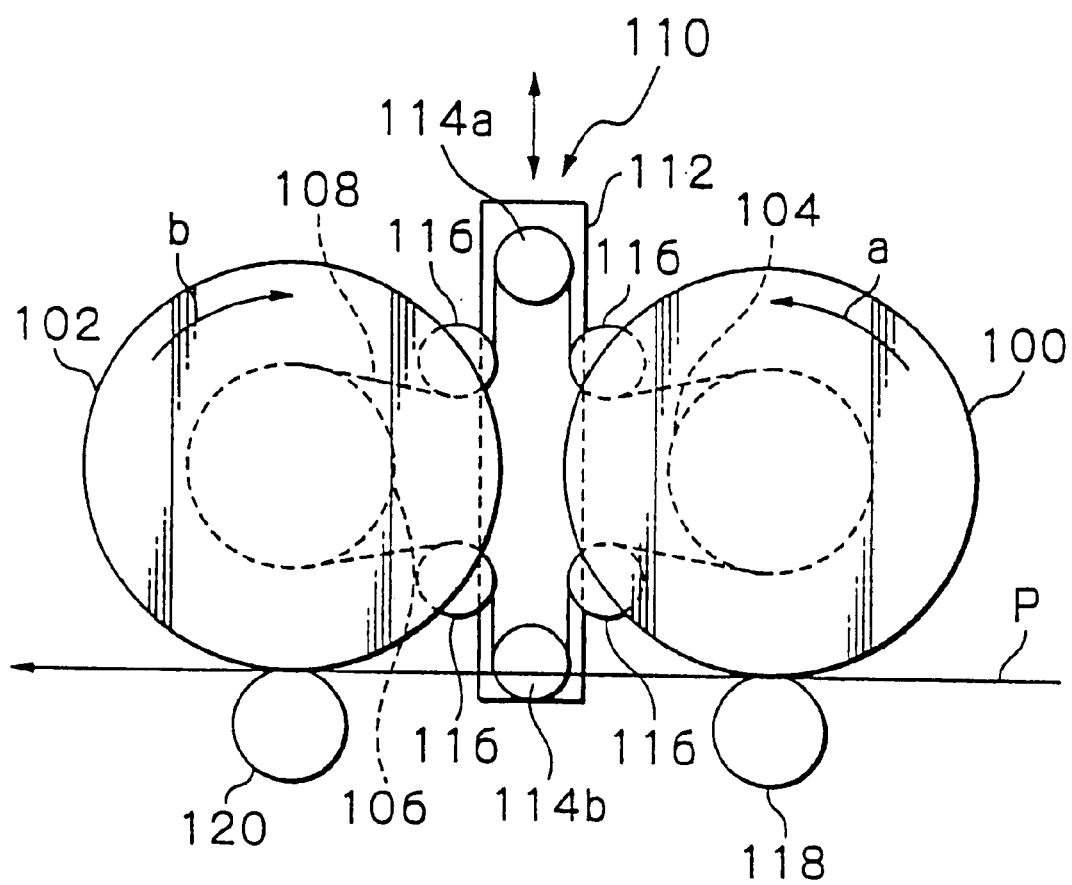
FIG. 1 is a front view showing a connecting system using a timing belt included in a conventional stencil printer.

To better understand the present invention, reference will be made to a conventional single path, color stencil printer constructed to obviate offset ghosts, shown in FIG. 1. As shown, the stencil printer includes two print drums 100 and 102 spaced from each other in a direction in which a paper sheet or similar recording medium P is conveyed. The print drums 100 and 102 are respectively located at the upstream side and downstream side in the above direction. Toothed drive pulleys 104 and 106 are respectively mounted on the print drums 100 and 102, serving as timing pulleys.

A timing belt 108 is passed over the drive pulleys 104 and 106. In this configuration, the print drums 100 and 102 are driven while being connected together by the timing belt 108. A phase adjusting device 110 is positioned between the print drums 100 and 102. The phase adjusting device 110 adjusts a relative phase between the print drums 100 and 102, i.e., corrects a positional deviation between a first and a second color in the direction of paper conveyance or top-and-bottom direction.

Specifically, the phase adjusting device 110 includes a frame 112 movable up and down by being driven by drive means not shown. Toothed pulleys 114a and 114b for adjustment are rotatably mounted on the upper end and lower end of the frame 112, respectively, and held in mesh with the timing belt 108. Two pulleys 116 are fixed in place between the pulleys 114a and 114b and the print drum 100 while other two pulleys 116 are fixed in place between the pulleys 114a and 114b and the print drum 102. These pulleys 116 deflect the timing belt 108 and allow phase adjustment to be efficiently effected on the basis of the displacement of the phase adjusting means 110 in the up-and-down direction. The pulleys 116, which contact the rear surface of the timing belt 108, are implemented by spur pulleys. Press rollers 118 and 120 are movable into and out of contact with the print drums 100 and 102, respectively.

When the frame 112 and therefore the pulleys 114a and 114b for adjustment are moved upward, the print drums 100 and 102 are caused to rotate in directions a and b, respectively, and vary their phases. When the frame 112 is moved downward, the phases of the print drums 100 and 102 are varied in the opposite direction. The phase adjusting device 110 is capable of correcting a positional deviation between images to be printed on the paper sheet P in the direction of paper conveyance and is essential with a color stencil printer. The deviation is ascribable to a change in print speed by way of example.

The drive pulleys 104 and 106 and pulleys 114a and 114b each involves some eccentricity due to limited machining accuracy and assembling accuracy. The eccentricity of the timing belt 108 itself ascribable to the limited positional accuracy of a core wire included therein is another factor that should not be neglected. Moreover, considering the phase adjusting device 110, the pulleys 116 contacting the rear surface of the timing belt 108 aggravate the eccentricity of the belt 108 in relation to the irregular thickness.

As for the drive pulleys 104 and 106, eccentricity does not disturb the synchronous rotation of the print drums 100 and 102 because an offset ghost appears only once for a single rotation of the print drums 100 and 102, i.e., a single rotation of the drive pulleys 104 and 106. However, the eccentricity of the pulleys 104a and 104b disturbs the relative phase between the print drums 100 and 102 every time the pulleys 114a and 114b rotate or, when the timing belt 108 involves an eccentricity component, every time the drive pulleys 104 and 106 rotate. Why an offset ghost appears when the pulleys 114a and 114b are eccentric will be described hereinafter with reference to FIGS. 2 and 3.

Figure 2:
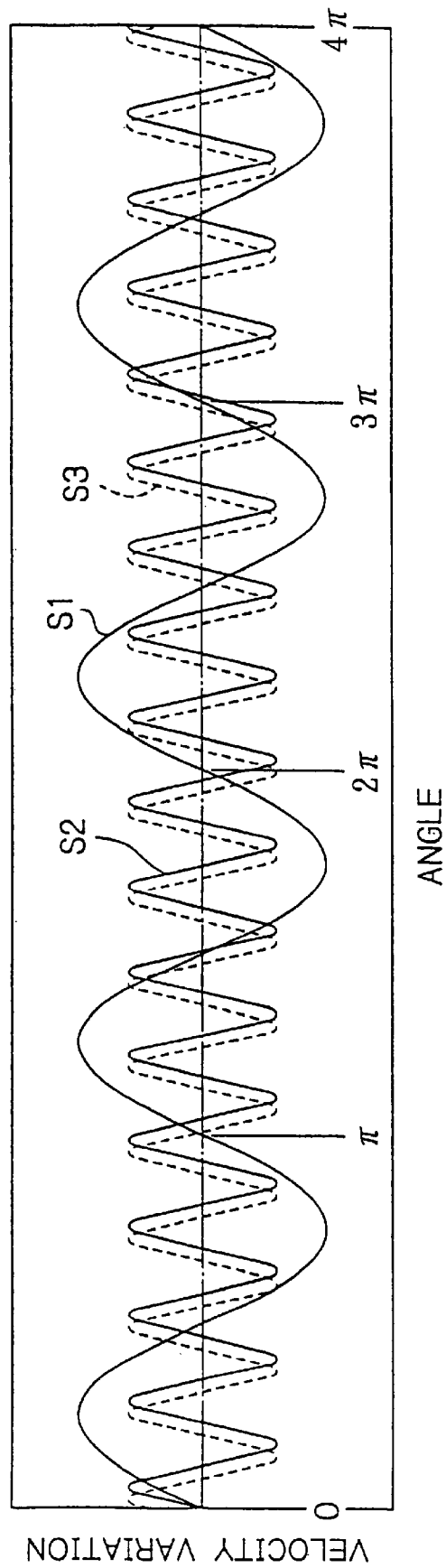
FIG. 2 is a graph showing velocity variations to occur when a pulley for adjustment, for example, is eccentric.

Assume that the ratio of the number of teeth of the drive pulley 104 or 106 to that of the pulley 114a or 114b is 4.3:1, i.e., the former is a non-integral multiple of the latter. Also, assume that the drive pulley 104 or 106 and pulley 114a or 114b are eccentric. FIG. 2 shows waveforms representative of the velocity variations of only the drive pulley 104 and pulley 114a by way of example measured under the above conditions. Specifically, a solid waveform S1 shows the velocity variation of the drive pulley 104. A solid waveform S2 shows the velocity variation of the pulley 114a; the origin of the waveform S2 is shown as being coincident with the origin of the waveform S1 for better understanding the relation. A phantom waveform S3 shows the velocity variation of the pulley 114a occurred when the drive pulley 104 and pulley 104a were different from each other in the position of eccentricity. As the waveform S3 indicates, the waveform of the pulley 114a has an origin that is, in many cases, not coincident with the original of the waveform of the drive pulley 104.

Figure 3:
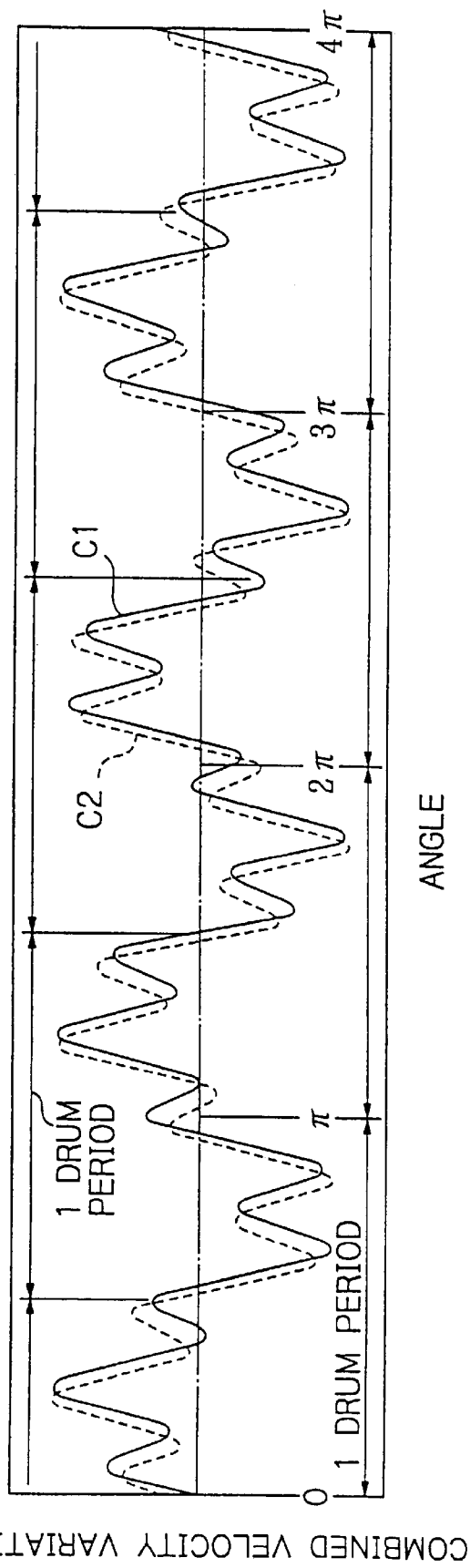
FIG. 3 is a graph showing combined waveforms derived from the waveforms of FIG. 2.

FIG. 3 shows a solid waveform C1, which is a combined form of the waveforms S1 and S2 of FIG. 2, and a phantom waveform C2, which is a combined form of the waveforms S1 and S3 of FIG. 2. As shown, wherever one drum period may begin, the velocity varies in a different manner every period. Consequently, the deviation between the print drums 100 and 102 varies in a different manner every period, resulting in an offset ghost.

Figure 4:
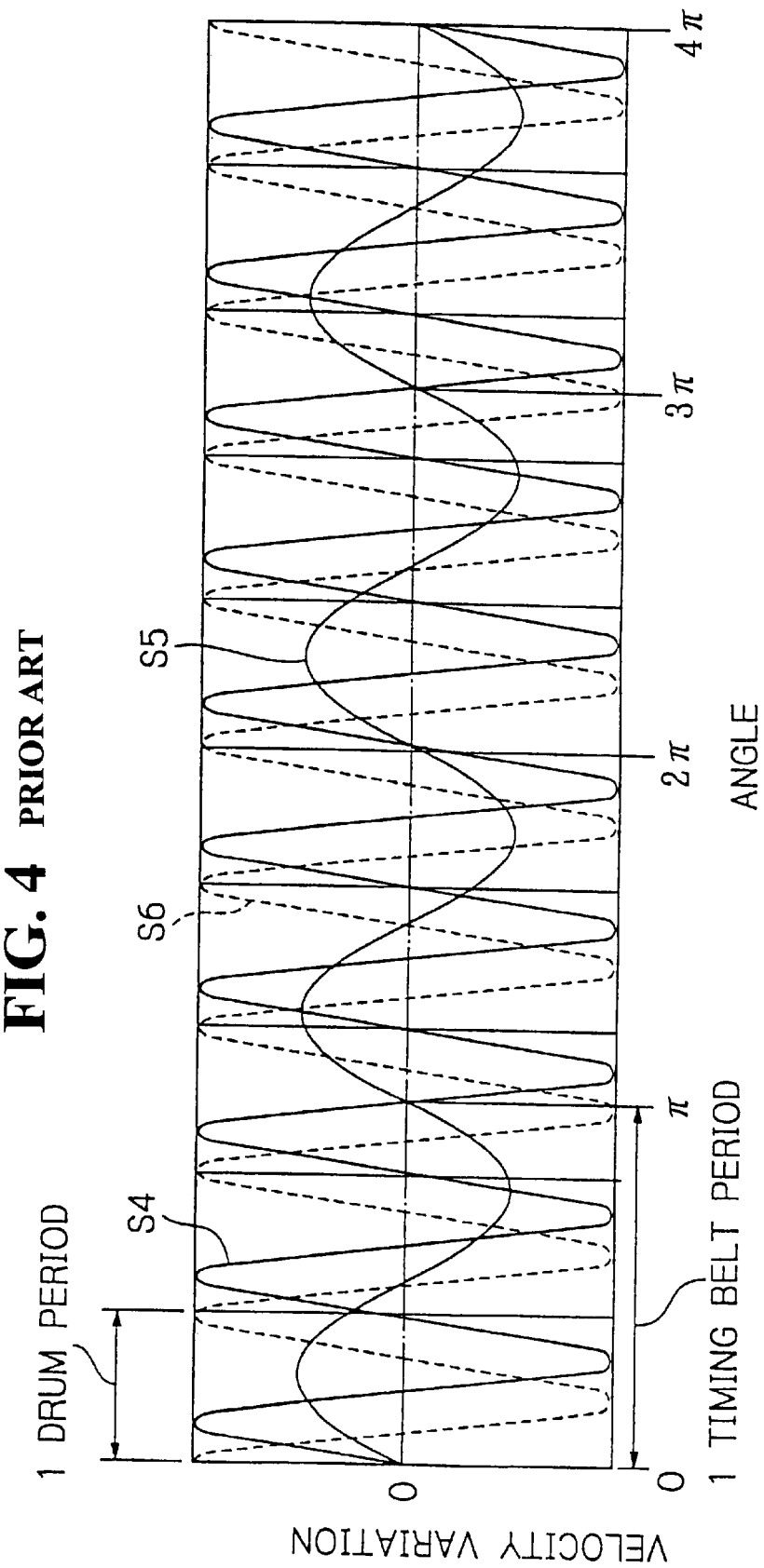
FIG. 4 is a graph showing velocity variations to occur when the drive pulley and a timing belt are eccentric.
Figure 5:
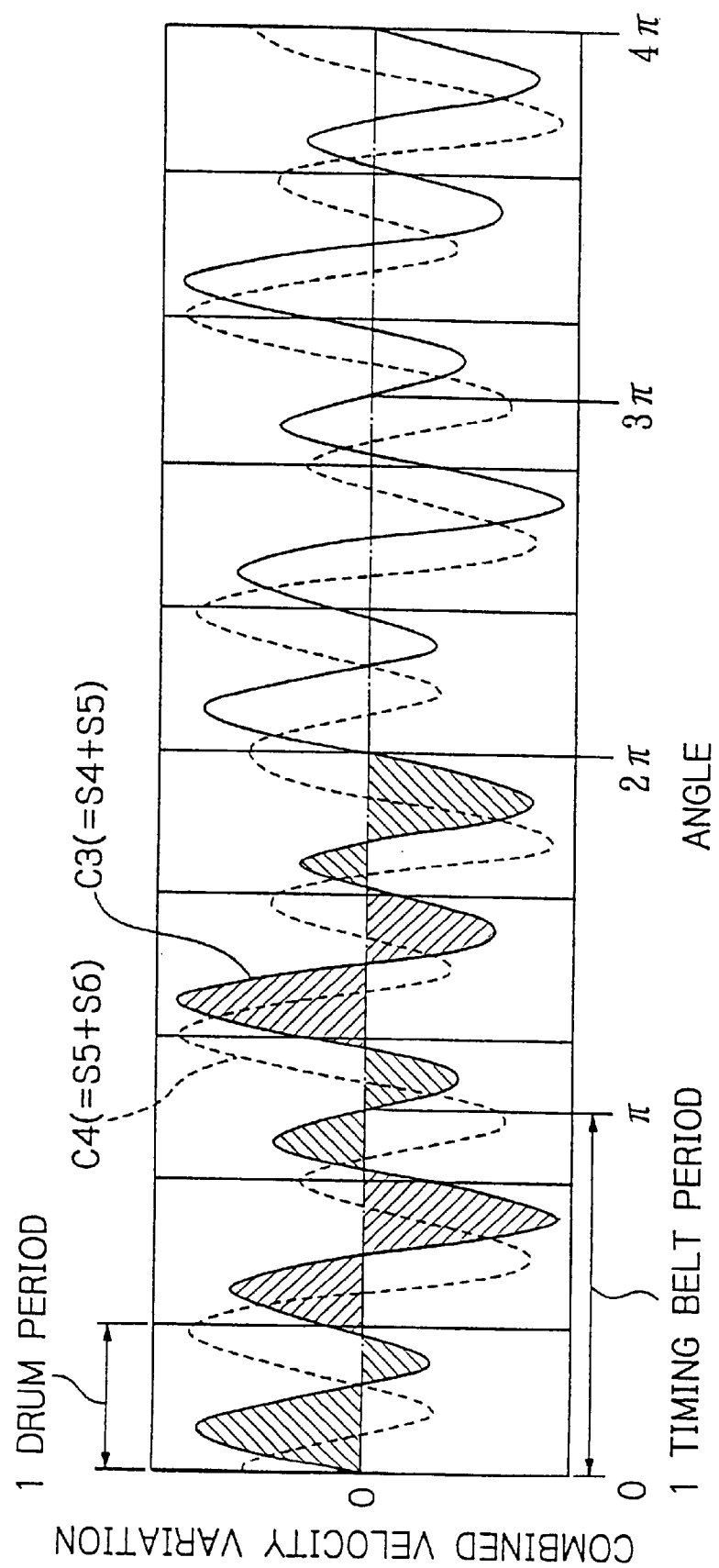
FIG. 5 is a graph showing combined waveforms derived from the waveforms of FIG. 4.
Figure 6:
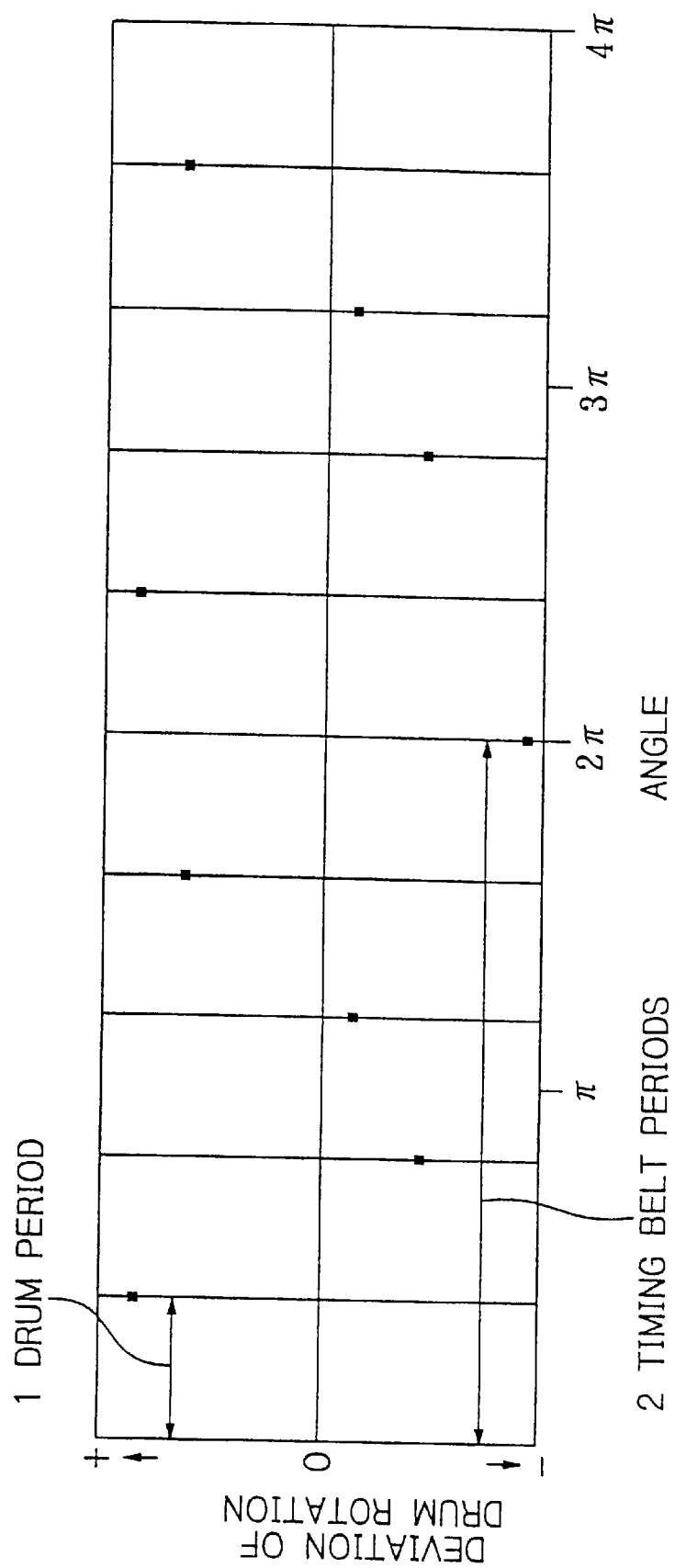
FIG. 6 is a graph plotting the deviations of rotation of a print drum in terms of the sum of areas derived from the waveforms of FIG. 4.

Reference will be made to FIGS. 4 through 6 for describing an offset ghost ascribable to the eccentricity of the timing belt 108. Assume that the ratio of the number of teeth of the drive pulley 104 or 106 to that of the timing belt 108 is 1:2.5, i.e., the latter is a non-integral multiple of the former. Also, assume that the drive pulley 104 or 106 and timing belt 108 are eccentric. FIG. 4 shows waveforms representative of the velocity variations of only the drive pulley 106 and timing belt 108 by way of example measured under the above conditions.

In FIG. 4, a solid waveform S4 shows the velocity variation of the drive pulley 106. A solid waveform S5 shows the velocity variation of the timing belt 108; the origin of the waveform S5 is shown as being coincident with the origin of the waveform S4 for better understanding the relation. A phantom waveform S6 shows the velocity variation of the drive pulley 106 occurred when the drive pulley 106 and timing belt 108 were different from each other in the position of eccentricity. As the waveform S6 indicates, the waveform of the drive timing belt 108 has an origin that is, in many cases, not coincident with the original of the waveform of the drive pulley 106.

FIG. 5 shows a solid waveform C3, which is a combined form of the waveforms S4 and S5 of FIG. 4, and a phantom waveform C4, which is a combined form of the waveforms S5 and S6 of FIG. 6. As shown, wherever one period begins, the velocity varies in a different manner every period. However, the timing belt 108 and drive pulley 106 respectively have two periods and five periods because of the preselected relation in the number of teeth. The waveform C3 therefore has the same pattern repeating every five periods of the drive pulley 106.

FIG. 6 plots the sums of the areas of hatched portions shown in FIG. 5 that occur during every period of the drive pulley 106. Each sum indicates a particular deviation of the synchronism of the drive pulley 106. It will be seen that the synchronism of the drive pulley 106 repeatedly deviates by the same amount every two periods of the timing belt 108.

Generally, gears, a timing belt and so forth that connect print drums involve some eccentricity do to limited machining accuracy, so that velocity unavoidably varies during one rotation. A gear train connecting print drums is highly rigid and allows the deviation of an offset ghost to be reduced if the accuracy of the individual gear is increased. However, using a plurality of precision gears is undesirable from the cost standpoint.

On the other hand, a timing belt connecting print drums reduces the overall cost because timing pulleys or similar low-cost parts, which can be produced by injection molding or similar technology on a quantity basis, suffice. This, however, brings about the previously discussed problem that the eccentricity of the timing belt and timing pulleys aggravates the deviation of an offset ghost.

Figure 7:
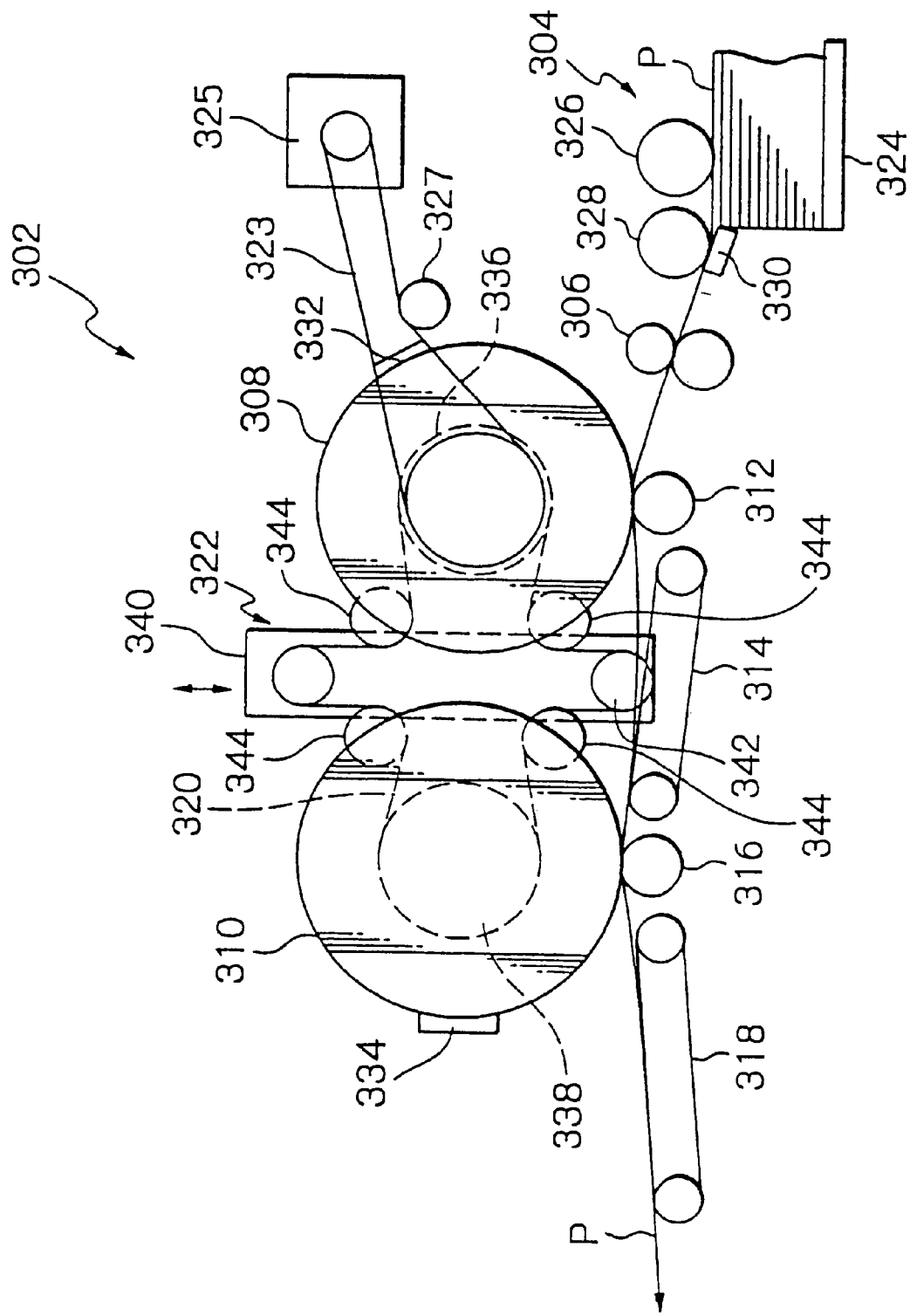
FIG. 7 is a front view showing a printer including a synchronous drive arrangement embodying the present invention.

Referring to FIG. 7, a stencil printer including a synchronous drive arrangement embodying the present invention will be described. As shown, the stencil printer, generally 302, includes two print drums 308 and 310. Paper feeding means 304 feeds a paper sheet P toward the print drums 308 and 310 via a registration roller pair 306. The print drums 308 and 310 are spaced from each other in the direction in which the paper sheet P is conveyed. A moving mechanism, not shown, moves a press roller 312 into and out of contact with the upstream print drum 308. Intermediate conveying means 314 is positioned between the print drums 308 and 310 for conveying the paper sheet P and includes an endless belt. A moving mechanism, not shown, moves a press roller 316 into and out of contact with the downstream print drum 310. Outlet conveying means 318 conveys the paper sheet P peeled off from the print drum 310 to a print tray not shown. A timing belt 320 connects the print drums 308 and 310. Phase adjusting means adjusts a relative phase between the print drums 308 and 310.

A main motor 325 causes the upstream print drum, or drive member, 308 to rotate via a main drive belt 323. The rotation of the print drum 308 is transmitted to the downstream print drum, or driven member, 310 via the timing belt 320. A pulley 327 applies tension to the main drive belt 323.

The paper feeding means 304 includes a tray 324 loaded with a stack of paper sheets P and intermittently movable upward. A pickup roller 326, a separator roller 328 and a separator pad 330 cooperate to pay out the top paper sheet P from the tray 324 toward the registration roller pair 306.

The registration roller pair 306 corrects, e.g., the skew of the paper sheet P. The roller pair 306 then drives the paper sheet P toward the print drum 308 at such a timing that the leading edge of the paper sheet P meets the leading edge of an image formed on the print drum 308.

Ink feeding means, not shown, is arranged within the print drum 308 and feeds ink of a first color to the inner periphery of the drum 308. The press roller 312 presses the paper sheet P arrived at the print drum 308 against the drum 308 via a master, which is wrapped around the drum 308. As a result, the ink is transferred to the paper sheet P via the porous portion of the print drum 308 and perforations formed in the master, printing an image on the paper sheet P in the first color. The press roller 312 is intermittently pressed against the print drum 308 so as not to interfere with a master damper 332 mounted on the drum 308.

Peeling means peels off the paper sheet P carrying the image thereon from the print drum 308. Subsequently, the previously mentioned belt included in the intermediate conveying means 314 conveys the paper sheet. At this instant, a fan also included in the conveying means 314 sucks the paper sheet P to thereby retain the paper sheet P on the belt. The conveying means 314 conveys the paper sheet P at a linear velocity preselected times higher than the linear velocity of the paper sheet P.

Ink feeding means, not shown, is also arranged within the print drum 310 and feeds ink of a second color to the inner periphery of the drum 310. As the paper sheet P with the image of the first color arrives at a nip between the downstream print drum 310 and the press roller 316, the roller 316 presses the paper sheet P against the drum 310. As a result, the ink is transferred to the paper sheet P via the porous portion of the print drum 308 and perforations formed in the master, printing an image on the paper sheet P in the second color over the image of the first color. The press roller 316 is intermittently pressed against the print drum 310 so as not to interfere with a master damper 334 mounted on the drum 310.

Peeling means, not shown, peels off the paper sheet or bicolor print P from the print drum 310. Subsequently, a belt included in the outlet conveying means 318 conveys the bicolor print P to the print tray not shown. At this instant, a fan also included in the conveying means 318 sucks the print P to thereby retain it on the belt.

Figure 8:
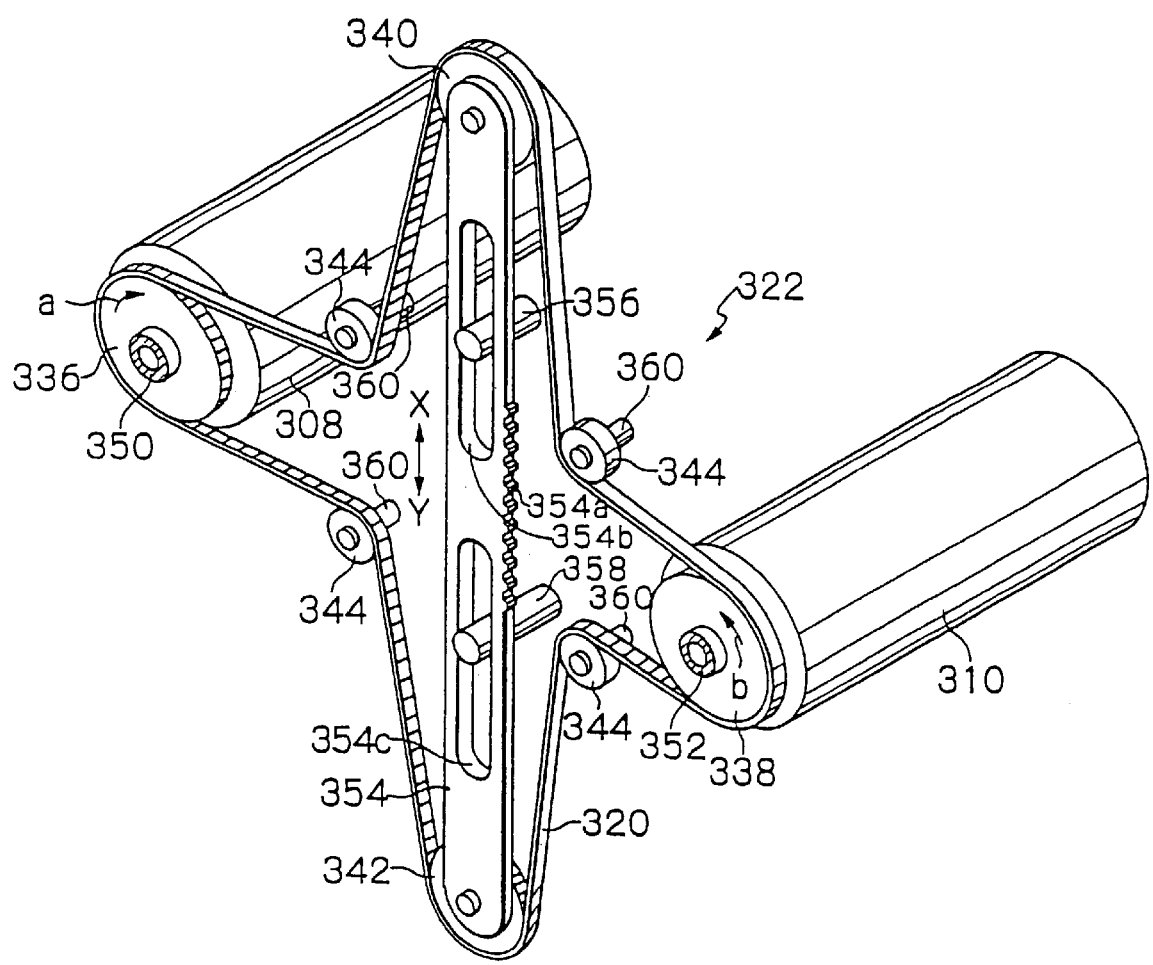
FIG. 8 is an isometric view of a phase adjusting device included in the illustrative embodiment.

As shown in FIG. 8, the print drums 308 and 310 are mounted on shafts 350 and 352, respectively. Toothed drive pulleys, or timing pulleys, 336 and 338 are mounted on the rear ends of shafts 350 and 352, respectively (front ends as viewed on the right side of the phase adjusting means 322 in FIG. 8), such that the print drums 308 and 310 are replaceable. A timing belt 320 is passed over the drive pulleys 336 and 338.

The phase adjusting means 322 includes a frame 354 elongate in the up-and-down direction. An upper pulley 340 and a lower pulley 342 for adjustment are respectively mounted on the upper end and lower end of the frame 354, playing the role of timing pulleys. Four pulleys 344 are fixed in place between the pulleys 340 and 342 and the drive pulleys 336 and 338, as illustrated. The pulleys 344 allow the relative phase to be efficiently adjusted by a small displacement of the frame 354. The pulleys 344 play the role of tension pulleys at the same time. The phase adjusting means 322 additionally includes a rack 354a formed in the frame 354, a pinion, not shown, meshing with the rack 354a, and a motor, not shown, for driving the pinion.

As shown in FIG. 8, elongate slots 354b and 354c are respectively formed in the upper portion and lower portion of the frame 354, and each extends in the up-and-down direction. Guide pins 356 and 358 are studded on a sidewall, not shown, included in the printer body. The guide pins 356 and 358 are received in the slots 354b and 354c, respectively. The frame 354 is movable up and down while being guided by the guide pins 356 and 358 and guide members, not shown, affixed to the sidewall of the apparatus body.

The pulleys, or spur pulleys, 344 each are rotatably mounted on a respective shaft 360 affixed to the sidewall of the printer body. The pulleys 344 contact the rear surface of the timing belt 320 while squeezing the belt 320, as illustrated.

Assume that the pinions, not shown, are rotated to cause the frame 354 to move upward in a direction X. Then, the pulleys 340 and 342 are moved upward together with the frame 354, causing the print drums 308 and 310 to rotate in directions a and b, respectively. As a result, a relative phase between the print drums 208 and 310 varies so as to correct a positional deviation between the first and second colors. When the pinion is rotated in the opposite direction, the frame 354 is moved downward in a direction Y and effects phase adjustment in the opposite direction.

The drive pulleys 336 and 338 have the same number of teeth, which is greater than the number of teeth of the pulleys 340 and 342 included in the phase adjusting means 322. The pulleys 340 and 342 have the same number of teeth.

Figure 9:
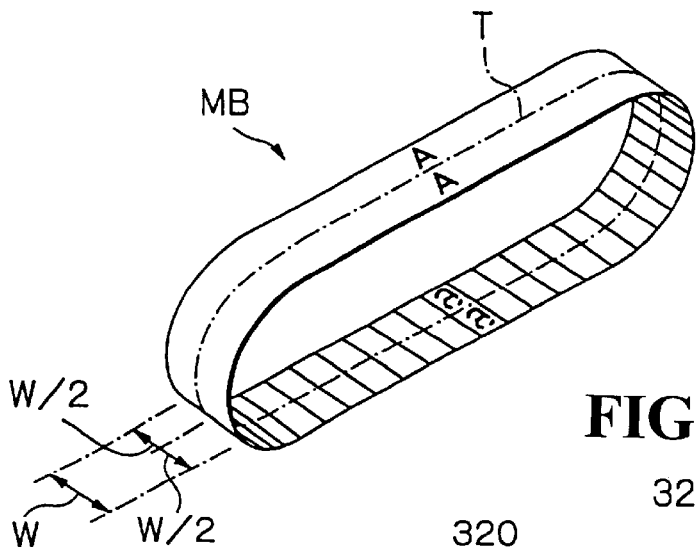
FIG. 9 is an isometric view of an original belt from which narrow belt parts included in the illustrative embodiment are produced.
Figure 10:
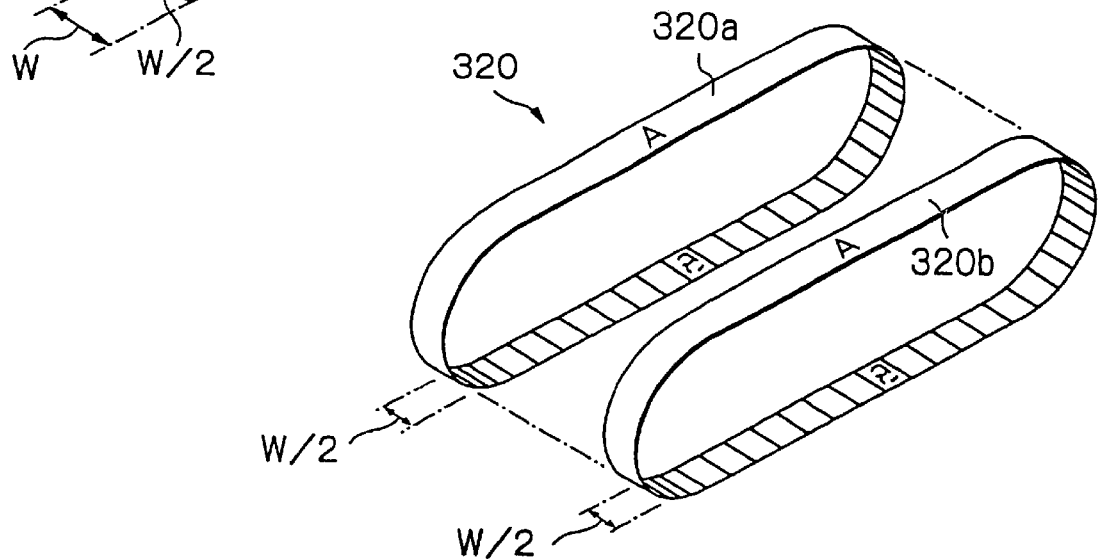
FIG. 10 is an exploded view showing the timing belt of FIG. 9 divided into two narrow belt parts.
Figure 11:
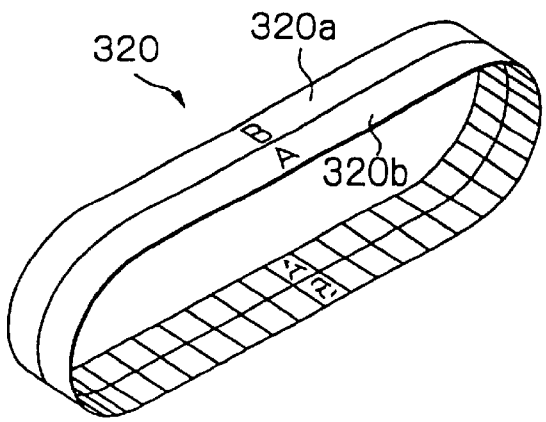
FIG. 11 is an isometric view showing the two belt parts of FIG. 10 put together.

As shown in FIGS. 10 and 11, the timing belt 320 is made up of two narrow belt parts 320a and 320b positioned side by side in the axial direction of the print drums 308 and 310, i.e., drive pulleys 336 and 338. FIG. 9 shows a single original belt MB for implementing the timing belt 320. The original belt MB has a width W in the axial direction of the print drums 308 and 310 and n teeth. In FIG. 9, the thickness and length of the timing belt 320 are not shown specifically.

FIG. 10 shows the narrow belt parts 320a and 320b produced by dividing the original single belt MB in two. In the illustrative embodiment, the eccentricity of the timing belt 320 is reduced on the basis of the adjustment of the positional relation between the two belt parts 320a and 320b. In FIGS. 10 and 11, to clearly show the positional relation between the belt parts 320a and 320b, a letter A is attached to the outside center of the upper run of each of the belt parts 320a and 320b. Likewise, a letter B (phantom line) is attached to the outside center of the lower run of each of the belt parts 320a and 320b, i.e., the position of the lower run corresponding to one-half of the number of teeth n.

As shown in FIG. 11, in the illustrative embodiment, the belt parts 320a and 320b have their cur or divided end faces abutted against each other. It is noteworthy that the belt part 320a is shifted from the belt part 320b by one-half of the number of teeth n, as the letters A and B indicate. With this configuration, it is possible to cancel the eccentricity of the entire timing belt 320, as will be described hereinafter.

Figure 12A:
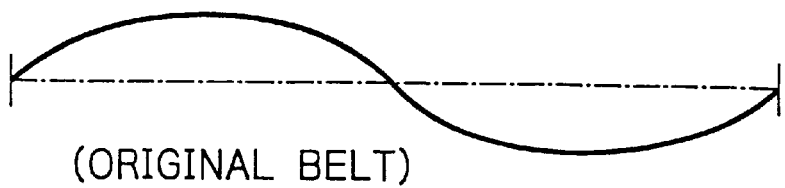
FIG. 12(*a*) shows a wave form representative of velocity variation particular to the belt of FIG. 9, FIG. 12(*b*) shows waveforms representative of the velocity variation of the individual belt part shown in FIG. 10.
FIG. 12(c) shows waveforms representative of the velocity variations of the two belt parts combined in such a manner as to cancel each other's eccentricity component.
FIG. 12(d) shows a waveform representative of a condition in which the eccentric components are canceled.
Figure 12B:
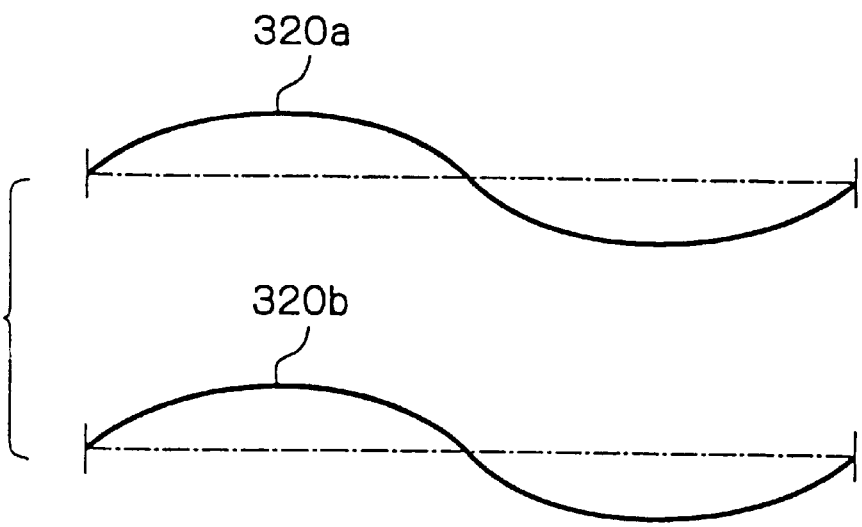

FIG. 12(a) shows a specific waveform representative of the velocity variation of the single timing belt 320. As shown in FIG. 12(b), the velocity of the individual belt part 320a or 320b, which is derived from the single original belt, varies in the same manner as in FIG. 12(a).

Figure 12C:
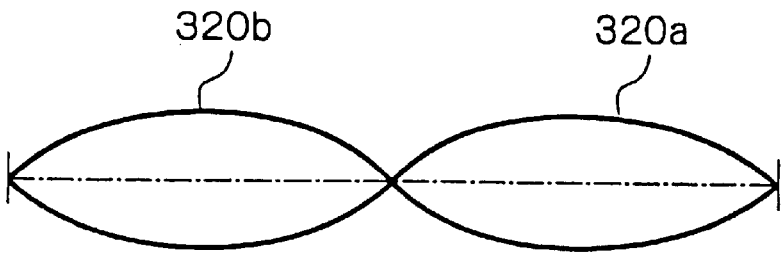
Figure 12D:

As shown in FIG. 12(c), the shift of the belt part 320a from the belt part 320b by one-half of the number of teeth n means that the eccentricity component of the belt part 320a and that of the belt part 320b appear symmetrically to each other. Stated another way, the two eccentricity components cancel each other and therefore the eccentricity of the entire timing belt 320, as shown in FIG. 12(d). This is successful to accurately reduce an offset ghost ascribable to the eccentricity of the timing belt 320.

How the illustrative embodiment reduces an offset ghost ascribable to the eccentricity of rotary members other than the timing belt 320 will be described hereinafter. In the illustrative embodiment, the pulleys 340 and 342 for adjustment each has a number of teeth that is 1/integer of the number of teeth of the drive pulley 336 or 338. Stated another way, the drive pulleys 336 and 338 each has a number of teeth that is an integral multiple of the number of teeth of the pulley 340 or 342. For example, when the drive pulley 336 or 338 has 144 teeth, the pulley 340 or 342 has thirty-six teeth. In this condition, even if the pulleys 340 and 342 are eccentric, no deviation in phase or synchronous rotation occurs between the print drums 308 and 310 because of the relation in the number of teeth. Consequently, an offset ghost is successfully reduced. This will be described more specifically hereinafter with reference to FIGS. 13 and 14.

Figure 13:
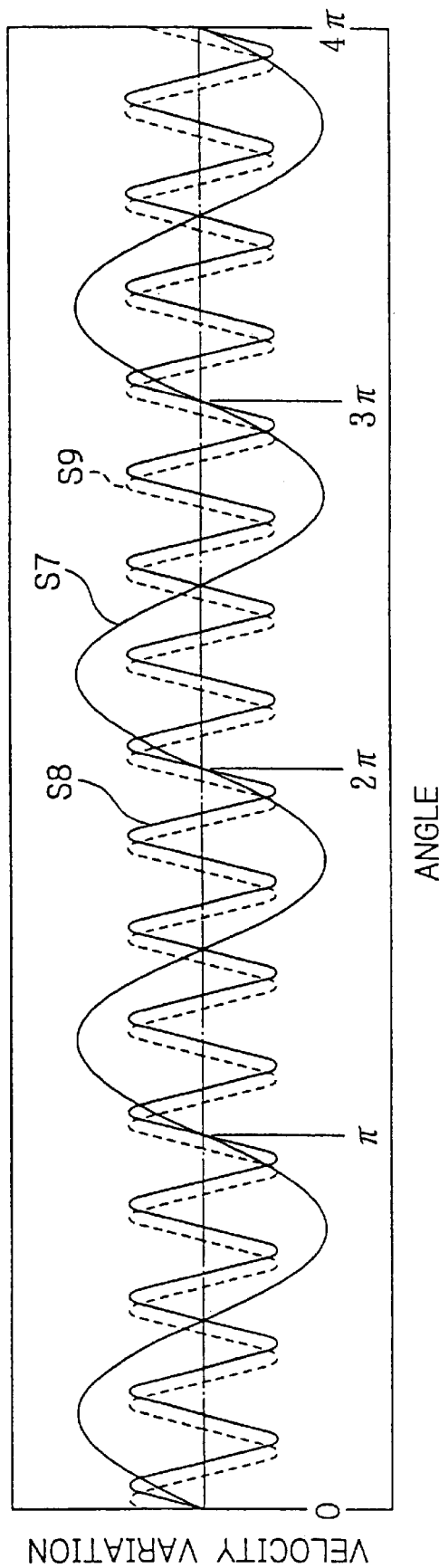
FIG. 13 is a chart showing waveforms representative of velocity variation ascribable to the eccentricity of, e.g., pulleys for adjustment.

In FIG. 13, a solid waveform S7 shows the velocity variation of the drive pulley 336. A solid waveform S8 shows the velocity variation of the pulley 340; the origin of the waveform S8 is shown as being coincident with the origin of the waveform S7 for better understanding the relation. A phantom waveform S9 shows the velocity variation of the pulley 340 occurred when the drive pulley 336 and pulley 340 were different from each other in the position of eccentricity. If positions of eccentricity are coincident, just four periods of the pulley 340 (342) occur during one period of the drive pulley 336 (338).

Figure 14:
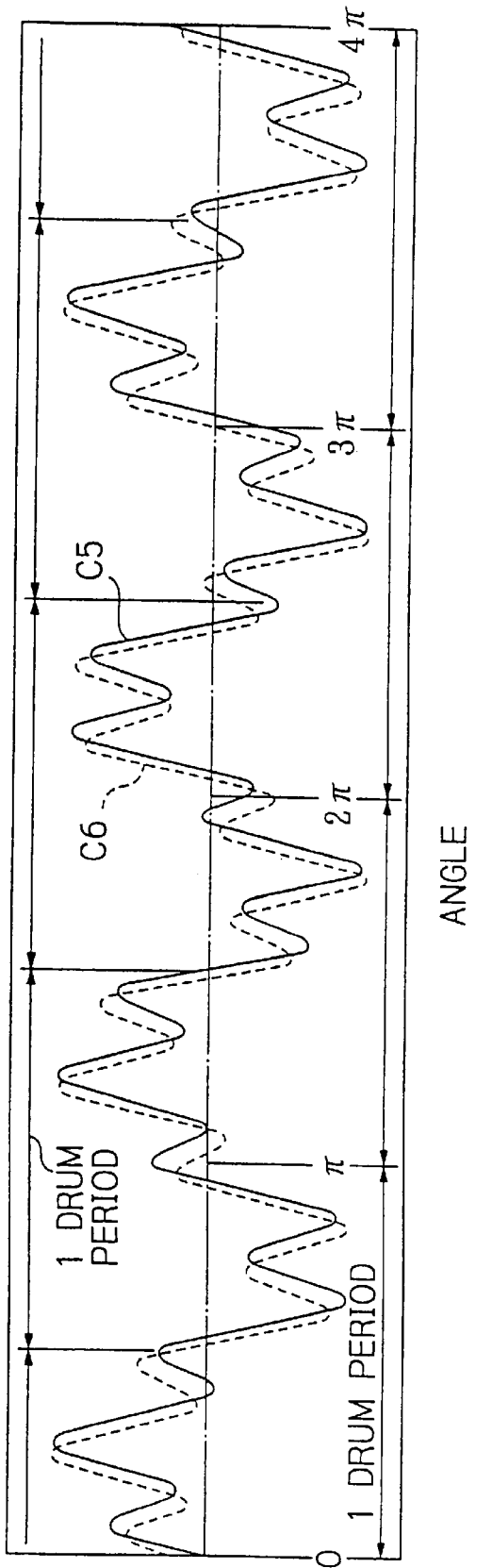
FIG. 14 is a chart showing combined waveforms derived from the waveforms of FIG. 13.

FIG. 14 shows a solid waveform C5, which is a combined form of the waveforms S7 and S8 of FIG. 13, and a phantom waveform C6, which is a combined form of the waveforms S8 and S9 of FIG. 13. As shown, wherever one period begins, the velocity varies in the same manner every period, i.e., the velocity varies in the same pattern on both of the waveforms C5 and C6. It follows that the print drums 308 and 310 deviate in the same manner every period, obviating an offset ghost.

The illustrative embodiment includes the pulleys 344 for deflecting the timing belt 320. Even if the pulleys 344 are absent, the previously stated condition of 1/integer successfully reduces an offset ghost for the reasons described above.

Figure 15:
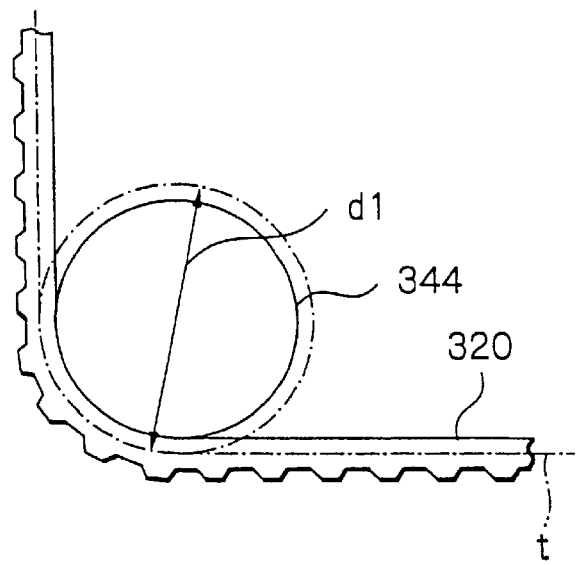
FIG. 15 is a view showing the concept of the pitch circle diameter of a pulley for deflection.

When the pulleys 344 are present, the pitch circle diameter of the pulleys 344 may be selected to be 1/integer of the pitch circle diameter of the drive pulleys 336 and 338 in addition to the previous condition of 1/integer relating to the number of teeth. Stated another way, each of the drive pulleys 336 and 338 has a pitch circle diameter that is an integral multiple of the pitch circle diameter of the pulleys 344. For example, when the ratio of the pitch circle diameter of the drive pulleys 336 and 338 to that of the pulleys 344 may be selected to be 5:1, the pulleys 344 have the same pitch circle diameter. In this case, as shown in FIG. 15, each of the pulleys 344 has a pitch circle diameter d1 extending to the pitch line (core wire) t of the timing belt 320.

Assume that the pulleys 340 and 342 for adjustment are free from eccentricity, but the pulleys 344 for deflection are eccentric. Then, an offset ghost can be reduced only if the pitch circle diameter of the pulleys 344 are selected to be 1/integer of the pitch circle diameter of the drive pulleys 336 and 338.

144 teeth assigned to the drive pulleys 336 and 338 and 36 teeth assigned to the pulleys 340 and 342 are a preferred example of the ratio of 4:1. If the ratio of 4:1 using other numbers of teeth or another integral ratio of 3:1 or 5:1 is selected in consideration of balance between accuracy and cost, then the number of teeth of the drive pulleys 336 and 338 should be between 108 and 180.

As shown in FIG. 7, the illustrative embodiment connects the print drums 308 and 310 simply with the timing belt 320 passed over the drive pulleys 336 and 338 and rotary members including pulleys 340 and 342 for adjustment and pulleys 344 for deflection. This obviates the need for precision gears. Therefore, even if any one of the above rotary members is eccentric, the ratio of the pitch circle diameter of the individual rotary member to that of the drive pulley 336 and 338 remains to be 1/integer, obviating a phase difference between the print drums 308 and 310. However, the ratio of the number of teeth of the timing belt 320 to that of the drive pulleys 336 and 338 cannot be 1:1 due to the extremely simple connecting scheme. As a result, the eccentricity of the timing belt 320 itself is the only possible cause of phase deviation.

Nevertheless, the timing belt 320 can be implemented by one having a pitch as small as 3 mm or less and a core wire highly accurately positioned. Therefore, an offset ghost ascribable to the timing belt 320 can be reduced. This, coupled with the reduction of an offset ghost ascribable to the other rotary members, promotes accurate reduction of an offset ghost of the entire printer.

Figure 16:
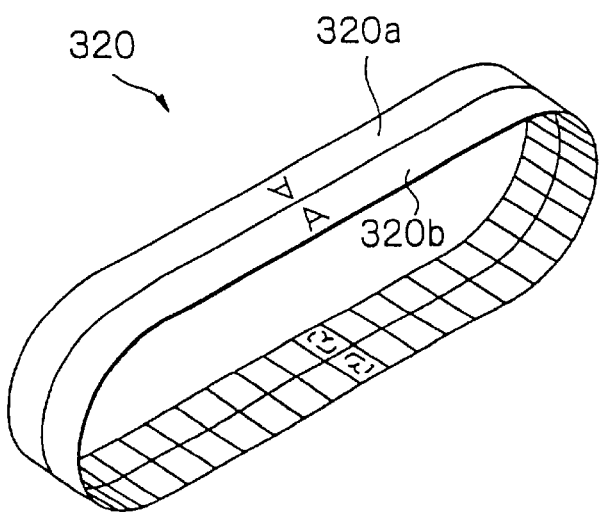
FIG. 16 is a perspective view showing a timing belt representative of an alternative embodiment of the present invention.

FIG. 16 shows an alternative embodiment of the present invention. As shown, the narrow belt part 320a, for example, is reversed in position and has its non-divided end face abutted against the divided end face of the other narrow belt part 320b. The teeth of the belt part 320a and those of the belt part 320b are aligned with each other in the original condition of the single belt. In this configuration, too, the belt parts 320a and 320b cancel each other's eccentricity component and thereby reduces an offset ghost ascribable to the eccentricity of the entire timing belt 320.

Figure 17:
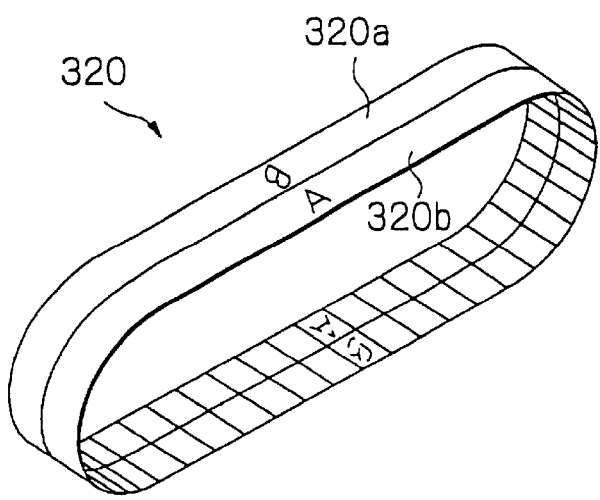
FIG. 17 is a perspective view showing another alternative embodiment of the present invention.

Further, as shown in FIG. 17, the belt part 320a reversed in position, as shown in FIG. 16, may be shifted from the other belt part 320b by one-half of the number of teeth n. This is also successful to cause the belt parts 320a and 320b to cancel each other's eccentricity component and therefore to reduce an offset ghost ascribable to the eccentricity of the entire timing belt 320.

In the embodiments shown and described, the timing belt 320 is constituted by two narrow belt parts 320a and 320b. If desired, three or more narrow belt parts may be used and combined in such a manner as to cancel each other's eccentricity component during rotation.

The belt parts 320a and 320b have been shown and described as being produced by dividing a single belt. Alternatively, a plurality of narrow timing belts may be produced independently of each other and so combined as to cancel each other's eccentricity component.

While in the illustrative embodiments one belt part is shifted from the other belt part by one-half of the number of teeth n, the former may, of course, be shifted from the latter by any other suitable number of teeth so long as an offset ghost can be reduced.

While the illustrative embodiments have concentrated on a printer, the present invention is similarly applicable to any other synchronous drive arrangement that needs accurate synchronous rotation.

In summary, it will be seen that the present invention provides a synchronous drive arrangement having various unprecedented advantages, as enumerated below.

(1) A timing belt is implemented by a plurality of narrow belt parts so combined as to cancel each other's eccentricity component during rotation. The eccentricity of the entire timing belt can therefore be canceled during rotation. This reduces synchronization errors ascribable to the eccentricity of the timing belt while preserving the low-cost configuration of timing belt connection.

(2) The belt parts are formed of the same material and therefore combined such that their eccentricity components are symmetrical as to waveform. It follows that synchronization errors ascribable to the eccentricity of the timing belt can be easily reduced.

(3) The belt parts are abutted against each other at their divided end faces and shifted from each other by a preselected number of teeth. This accurately reduces synchronization errors ascribable to the eccentricity of the timing belt.

(4) One of the belt parts is shifted from the other belt part by one-half of the number of teeth, so that the eccentricity components of the belt parts are symmetric as to waveform. This also accurately reduces synchronization errors ascribable to the eccentricity of the timing belt.

Various modifications will become possible for those skilled in the art after receiving the teachings of the present disclosure without departing from the scope thereof.

What is claimed is:

1. A synchronous drive arrangement comprising:
   a drive member including a drive member toothed pulley;
   a driven member including a driven member toothed pulley; and
   a timing belt passed over said drive member toothed pulley and said driven member toothed pulley for causing said drive member and said driven member to rotate in synchronism with each other, said timing belt including a plurality of narrow belt parts arranged side by side in an axial direction of said pulleys and so positioned as to cancel each other's eccentricity component, and said plurality of narrow belt parts being two narrow belt parts produced by dividing a single timing belt.

2. An arrangement as claimed in claim 1, wherein said two narrow belt parts are produced by dividing a single timing belt in tow.

3. An arrangement as claimed in claim 2, wherein said two narrow belt parts are abutted against each other at divided end faces thereof and have teeth shifted from each other.

4. An arrangement as claimed in claim 3, wherein assuming that said timing belt has n teeth, said narrow belt parts are shifted from each other by one-half of a number of teeth n.

5. An arrangement as claimed in claim 2, wherein one of said narrow belt parts is reversed in position and has a non-divided end face thereof abutted against a divided end face of the other narrow belt part, teeth of said narrow belts aligning with each other in an original condition of the single timing belt.

6. An arrangement as claimed in claim 2, wherein one of said narrow belt parts is reversed in position and has a non-divided end face thereof abutted against a divided end face of the other narrow belt part with teeth being shifted from teeth of said other narrow belt part.

7. An arrangement as claimed in claim 6, wherein assuming that said timing belt has n teeth, said narrow belt parts are shifted from each other by one-half of a number of teeth n.

8. An arrangement as claimed in claim 1, wherein said two narrow belt parts are abutted against each other at divided end faces thereof and have teeth shifted from each other.

9. An arrangement as claimed in claim 8, wherein assuming that said timing belt has n teeth, said narrow belt parts are shifted from each other by one-half of a number of teeth n.

10. An arrangement as claimed in claim 1, wherein one of said narrow belt parts is reversed in position and has a non-divided end face thereof abutted against a divided end face of the other narrow belt part, teeth of said narrow belts aligning with each other in an original condition of the single timing belt.

11. An arrangement as claimed in claim 1, wherein one of said narrow belt parts is reversed in position and has a non-divided end face thereof abutted against a divided end face of the other narrow belt part with teeth being shifted from teeth of said other narrow belt part.

12. An arrangement as claimed in claim 11, wherein assuming that said timing belt has n teeth, said narrow belt parts are shifted from each other by one-half of a number of teeth n.

13. A method of causing a drive member and a driven member, which are spaced from each other, to rotate in synchronism with each other, the method comprising the steps of:

providing said drive member with a drive member toothed pulley;

providing said driven member with a driven member toothed pulley;

passing a timing belt over said drive member and said driven member to engage said drive member toothed pulley and said driven member toothed pulley, respectively, dividing a single timing belt to form two narrow belt parts;

arranging said two narrow belt parts of said timing belt so as to be side by side each other in an axial direction of said drive member or said driven member; and canceling an eccentricity component of a first of said two narrow belt parts to cancel an eccentricity component of a second of said two narrow belt parts during rotation.

* * * * *

UNITED STATES PATENT AND TRADEMARK OFFICE
CERTIFICATE OF CORRECTION

PATENT NO. : 6,592,481 B2
DATED : July 15, 2003
INVENTOR(S) : Hisashi Sato et al.

It is certified that error appears in the above-identified patent and that said Letters Patent is hereby corrected as shown below:

Column 5,
Line 24, please replace "do" with -- due --.

Column 6,
Lines 16 and 36, please replace "damper" with -- clamper --.

Column 8,
Line 17, please insert the following paragraph:
-- FIG. 13 shows velocity variations ascribable to the eccentricity of the drive pulleys 336 and 338 and that of pulleys 340 and 342 and determined when the ratio of the number of teeth of the pulleys 336 and 338 to that of the pulleys 340 and 342 was 4:1. It is to be noted that FIG. 12 concentrates on the pulley 336 and pulley 340 by way of example. --

Signed and Sealed this

Thirteenth Day of July, 2004

JON W. DUDAS
*Acting Director of the United States Patent and Trademark Office*